United States Patent
Cohen et al.

(10) Patent No.: US 10,657,573 B2
(45) Date of Patent: *May 19, 2020

(54) NETWORK SITE TAG BASED DISPLAY OF IMAGES

(71) Applicant: Houzz, Inc., Palo Alto, CA (US)

(72) Inventors: Alon Cohen, Palo Alto, CA (US); Guy Shaviv, Zichron Yaakov (IL)

(73) Assignee: Houzz, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,925

(22) Filed: Nov. 30, 2015

(65) Prior Publication Data

US 2016/0077714 A1 Mar. 17, 2016

Related U.S. Application Data

(63) Continuation of application No. 13/472,409, filed on May 15, 2012, now Pat. No. 9,230,223.

(Continued)

(51) Int. Cl.
*G06F 3/0481* (2013.01)
*G06F 3/0487* (2013.01)
(Continued)

(52) U.S. Cl.
CPC ....... *G06Q 30/0631* (2013.01); *G06F 3/0482* (2013.01); *G06F 3/0483* (2013.01);
(Continued)

(58) Field of Classification Search
CPC .... G06F 3/04817; G06F 3/0485; G06F 3/017; G06F 3/0346; G06F 2200/1637;
(Continued)

(56) References Cited

U.S. PATENT DOCUMENTS 5,847,706 A 12/1998 Kingsley
6,041,335 A * 3/2000 Merritt .................. G06F 17/212
715/203

(Continued)

FOREIGN PATENT DOCUMENTS

WO 2010062800 A1 6/2010
WO 2010141637 A1 12/2010
WO WO-2013086022 6/2013

OTHER PUBLICATIONS

"The Pendulum, Part 1." Mar. 20, 1998. [Retrieved on Sep. 9, 2014]. Retrieved from the Internet <URL: https://www.math.duke.edu/education/ccp/materials/diffeq/pendulum/pend1.html>.*

(Continued)

*Primary Examiner* — Kieu D Vu
*Assistant Examiner* — Blaine T. Basom
(74) *Attorney, Agent, or Firm* — Schwegman Lundberg & Woessner, P.A.

(57) ABSTRACT

A platform allows experts, for example home improvement professionals, to upload their portfolios, i.e. content such as photos, videos, text, and sound, to a publicly available resource, such as a Web browser accessible, network based commerce system. Users may then browse the content, for example by room, style, and metro area. The content is arranged in collections that are in part passively sorted, based upon user relevance. Tags are shown on objects, for example within photos, for which there is more information. In the case of a movable display device, the tags can simulate the physics of real tags, for example they can move back and forth when the device is shaken. In another embodiment, a snap point is set to impart either a scrolling transition or a step transition between display pages, based upon user scroll activity.

16 Claims, 18 Drawing Sheets

Related U.S. Application Data

(60) Provisional application No. 61/567,012, filed on Dec. 5, 2011.

(51) Int. Cl.

| | |
|---|---|
| G06T 3/00 | (2006.01) |
| G06Q 30/06 | (2012.01) |
| G06F 3/0485 | (2013.01) |
| G06Q 30/02 | (2012.01) |
| G06F 3/0483 | (2013.01) |
| G06F 40/14 | (2020.01) |
| G06F 40/103 | (2020.01) |
| G06Q 10/00 | (2012.01) |
| G06F 3/0484 | (2013.01) |
| G06F 3/0482 | (2013.01) |
| G06T 11/60 | (2006.01) |

(52) U.S. Cl.
CPC .......... *G06F 3/0485* (2013.01); *G06F 3/0487* (2013.01); *G06F 3/04817* (2013.01); *G06F 3/04842* (2013.01); *G06F 3/04845* (2013.01); *G06F 40/103* (2020.01); *G06F 40/14* (2020.01); *G06Q 10/00* (2013.01); *G06Q 30/02* (2013.01); *G06Q 30/06* (2013.01); *G06Q 30/0641* (2013.01); *G06Q 30/0643* (2013.01); *G06T 3/0006* (2013.01); *G06T 11/60* (2013.01)

(58) Field of Classification Search
CPC .. G06F 1/1694; G06F 3/0481; G06F 3/04815; G06F 3/0484; G06F 3/04845; G06F 3/0487; G06F 3/0488; G06F 2200/1614; G06F 3/0483; G06F 3/0482; G06F 3/04842; A63F 13/57; A63F 13/573; H04M 2250/12; H04W 64/006; G06T 2219/2016; G06T 2215/16; G06T 11/60; G06T 3/0006; G06Q 30/0631; G06Q 30/0641; G06Q 30/0643; G06Q 30/06; G06Q 30/02; G06Q 10/00
See application file for complete search history.

(56) References Cited

U.S. PATENT DOCUMENTS

| | | | |
|---|---|---|---|
| 6,320,591 B1* | 11/2001 | Griencewic | G06F 17/30014 345/582 |
| 6,456,305 B1 | 9/2002 | Qureshi et al. | |
| 7,028,258 B1 | 4/2006 | Thacker et al. | |
| 7,937,654 B1 | 5/2011 | Ayers et al. | |
| 8,121,902 B1* | 2/2012 | Desjardins | G06Q 30/0601 705/26.1 |
| 8,122,370 B2 | 2/2012 | Hoguet | |
| 8,300,068 B2* | 10/2012 | Yamada | G01C 21/36 340/995.14 |
| 8,305,365 B2* | 11/2012 | Takata | G06F 1/1626 345/184 |
| 8,548,874 B2 | 10/2013 | Nations et al. | |
| 8,560,533 B1 | 10/2013 | He et al. | |
| 8,738,630 B2* | 5/2014 | Lin | G06F 17/30265 707/708 |
| 9,588,632 B1 | 3/2017 | Amacker et al. | |
| 2003/0067489 A1 | 4/2003 | Candy Wong et al. | |
| 2004/0075673 A1 | 4/2004 | Vale et al. | |
| 2005/0062758 A1 | 3/2005 | Kaasila et al. | |
| 2006/0012616 A1 | 1/2006 | Paek | |
| 2006/0085277 A1* | 4/2006 | Arnston | G06Q 10/087 705/26.62 |
| 2006/0100482 A1 | 5/2006 | Hale et al. | |
| 2006/0236264 A1 | 10/2006 | Cain et al. | |
| 2007/0083810 A1 | 4/2007 | Scott et al. | |
| 2007/0266335 A1 | 11/2007 | Zielinski et al. | |
| 2009/0002391 A1* | 1/2009 | Williamson | G06F 1/1626 345/619 |
| 2009/0171783 A1* | 7/2009 | Raju | G06F 17/30256 705/14.26 |
| 2009/0201270 A1* | 8/2009 | Pikkujamsa | G06F 1/1626 345/184 |
| 2009/0315839 A1* | 12/2009 | Wilson | G06F 17/5009 345/173 |
| 2010/0041431 A1* | 2/2010 | Kim | G06F 1/1624 455/550.1 |
| 2010/0049802 A1 | 2/2010 | Ramen | |
| 2010/0088632 A1 | 4/2010 | Knowles et al. | |
| 2010/0146437 A1* | 6/2010 | Woodcock | G06Q 30/06 715/806 |
| 2010/0235259 A1* | 9/2010 | Farraro | G06Q 30/0601 705/26.1 |
| 2010/0313141 A1 | 12/2010 | Yu et al. | |
| 2011/0022957 A1 | 1/2011 | Lee | |
| 2011/0078560 A1 | 3/2011 | Weeldreyer et al. | |
| 2011/0087955 A1 | 4/2011 | Ho et al. | |
| 2011/0093361 A1* | 4/2011 | Morales | G06Q 10/087 705/26.62 |
| 2011/0099494 A1 | 4/2011 | Yan et al. | |
| 2011/0119575 A1 | 5/2011 | Whitmyer, Jr. | |
| 2011/0163944 A1* | 7/2011 | Bilbrey | G01D 21/02 345/156 |
| 2011/0184780 A1 | 7/2011 | Alderson et al. | |
| 2011/0211728 A1* | 9/2011 | Inose | G06Q 10/10 382/100 |
| 2011/0227945 A1* | 9/2011 | Ishige | G06T 19/006 345/633 |
| 2012/0060102 A1 | 3/2012 | Shohfi et al. | |
| 2012/0062604 A1 | 3/2012 | Lobo et al. | |
| 2012/0068923 A1* | 3/2012 | Tashiro | G06F 3/038 345/157 |
| 2012/0082341 A1* | 4/2012 | Takeuchi | G09B 29/106 382/103 |
| 2012/0096393 A1* | 4/2012 | Shim | G06F 3/0485 715/784 |
| 2012/0110442 A1 | 5/2012 | Sharkey et al. | |
| 2012/0154305 A1 | 6/2012 | Nunomaki | |
| 2012/0174005 A1 | 7/2012 | Deutsch et al. | |
| 2012/0203651 A1* | 8/2012 | Leggatt | G06F 17/30268 705/26.3 |
| 2013/0007667 A1 | 1/2013 | Sauve et al. | |
| 2013/0073420 A1 | 3/2013 | Kumm et al. | |
| 2016/0086251 A1 | 3/2016 | Cohen et al. | |
| 2016/0086259 A1 | 3/2016 | Cohen et al. | |

OTHER PUBLICATIONS

Gould et al. "Chapter 6. Oscillations and the Simulation Interface." Feb. 21, 2002. [Retrieved on Sep. 9, 2014]. Retrieved from the Internet <URL: http://physics.clarku.edu/courses/125/gtcdraft/chap6.pdf>.*
Henderson, E., "Houzz: The Ultimate Guide to Design", Retrieved online Jan. 18, 2013 at http://iphone.appstorm.net/reviews/lifestyle/houzz-the-ultimate-guide-to-design, Oct. 26, 2011, 8 Pages.
"U.S. Appl. No. 13/472,409, Examiner interview Summary dated Dec. 16, 2014", 3 pgs.
"U.S. Appl. No. 13/472,409, Final Office Action dated Apr. 10, 2015", 29 pgs.
"U.S. Appl. No. 13/472,409, Non Final Office Action dated Oct. 1, 2014", 28 pgs.
"U.S. Appl. No. 13/472,409, Notice of Allowance dated Aug. 24, 2015", 8 pgs.
"U.S. Appl. No. 13/472,409, Response filed Aug. 6, 2015 to Final Office Action dated Apr. 10, 2015", 14 pgs.
"U.S. Appl. No. 13/472,409, Response filed Dec. 9, 2014 to Non Final Office Action dated Oct. 1, 2014", 14 pgs.
"U.S. Appl. No. 14/954,945, Advisory Action dated Dec. 21, 2016", 3 pgs.
"U.S. Appl. No. 14/954,945, Examiner Interview Summary dated Jun. 16, 2016", 3 pgs.

(56) References Cited

OTHER PUBLICATIONS

"U.S. Appl. No. 14/954,945, Examiner Interview Summary dated Dec. 12, 2016", 3 pgs.
"U.S. Appl. No. 14/954,945, Final Office Action dated Sep. 29, 2016", 12 pgs.
"U.S. Appl. No. 14/954,945, Non Final Office Action dated Mar. 15, 2016", 15 pgs.
"U.S. Appl. No. 14/954,945, Non Final Office Action dated Apr. 10, 2017", 11 pgs.
"U.S. Appl. No. 14/954,945, Response filed Jun. 15, 2016 to Non Final Office Action dated Mar. 15, 2016", 8 pgs.
"U.S. Appl. No. 14/954,945, Response filed Nov. 29, 2016 to Final Office Action dated Sep. 29, 2016", 6 pgs.
"U.S. Appl. No. 14/954,956, Advisory Action dated Jan. 12, 2017", 3 pgs.
"U.S. Appl. No. 14/954,956, Examiner Interview Summary dated Jun. 28, 2016", 3 pgs.
"U.S. Appl. No. 14/954,956, Examiner interview Summary dated Dec. 8, 2016", 3 pgs.
"U.S. Appl. No. 14/954,956, Final Office Action dated Oct. 20, 2016", 26 pgs.
"U.S. Appl. No. 14/954,956, Non Final Office Action dated Mar. 28, 2016", 23 pgs.
"U.S. Appl. No. 14/954,956, Non Final Office Action dated May 18, 2017", 29 pgs.
"U.S. Appl. No. 14/954,956, Response filed Jun. 23, 2016 to Non Final Office Action dated Mar. 28, 2016", 10 pgs.
"U.S. Appl. No. 14/954,956, Response filed Aug. 18, 2017 to Non Final Office Action dated May 18, 2017", 14 pgs.
"U.S. Appl. No. 14/954,956, Response filed Dec. 9, 2016 to Final Office Action dated Oct. 20, 2016", 11 pgs.
"European Application Serial No. 12856365.7, Communication Pursuant to Article 94(3) EPC dated Jun. 12, 2017", 7 pgs.
"European Application Serial No. 12856365.7, Extended European Search Report dated Jul. 3, 2015", 9 pgs.
"European Application Serial No. 12856365.7, Response filed Jan. 20, 2016 to extended European Search Report dated Jul. 3, 2015", 10 pgs.
"International Application Serial No. PCT/US2012/067986, International Preliminary Report on Patentability dated Jun. 19, 2014", 19 pgs.
"International Application Serial No. PCT/US2012/067986, International Search Report dated Feb. 8, 2013", 2 pgs.
"International Application Serial No. PCT/US2012/067986, Written Opinion dated Feb. 8, 2013", 17 pgs.
"U.S. Appl. No. 14/954,945, Final Office Action dated Nov. 16, 2017", 12 pgs.
"U.S. Appl. No. 14/954,956, Examiner Interview Summary dated Sep. 12, 2017", 3 pgs.
"U.S. Appl. No. 14/954,956, Final Office Action dated Nov. 30, 2017", 31 pgs.
"Reflow the Contents of Adobe PDF Documents", Adobe Systems Incorporated, (2002), 1-3.
"U.S. Appl. No. 14/954,956, Non Final Office Action dated Sep. 4, 2018", 30 pgs.
"U.S. Appl. No. 14/954,956, Final Office Action dated Mar. 8, 2019", 23 pgs.
"U.S. Appl. No. 14/954,956, Response filed Dec. 4, 2018 to Non Final Office Action dated Sep. 4, 2018", 16 pgs.
"U.S. Appl. No. 14/954,956, Response filed Aug. 8, 2019 to Final Office Action dated Mar. 8, 2019", 19 pgs.

* cited by examiner

Products in this Photo

DESIGN WITHIN REACH

Eclipse Nesting Tables, Set of 3

$398.00 | BUY »

Archie Rug $950.00 | BUY »

Tripod Floor Lamp $350.00 | BUY »

HOUZZ TOUR
Pint-Size Cabin in Rural Canada
An ecofriendly and cost-effective house smaller than 300 square feet offers a fresh start

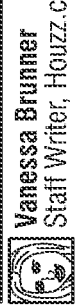
Vanessa Brunner
Staff Writer, Houzz.com

After surviving a divorce and a serious illness, Denise Franklin was more than ready to start over. With a $25,000 budget, she approached architect Henry Yorke Mann to help her build a home fit for a fresh start in rural British Columbia. Mann saved money by severely restricting the size and material cost. Designing the 280-square-foot space in a mandala shape, Mann gave this home all the essentials and more.

Houzz at a Glance

Who lives here: Denise Franklin

Location: Rural area outside Oliver, British Columbia

Size: 280 square feet, with a 100-square-foot basement

That's interesting: Only one builder was used, to save on labor cost.

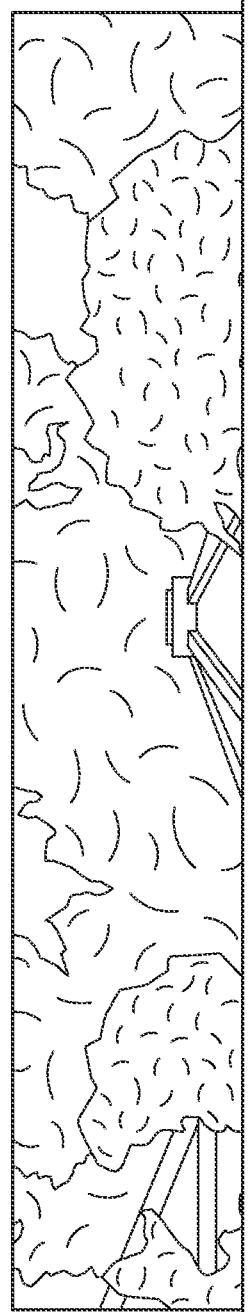

FIG. 11A

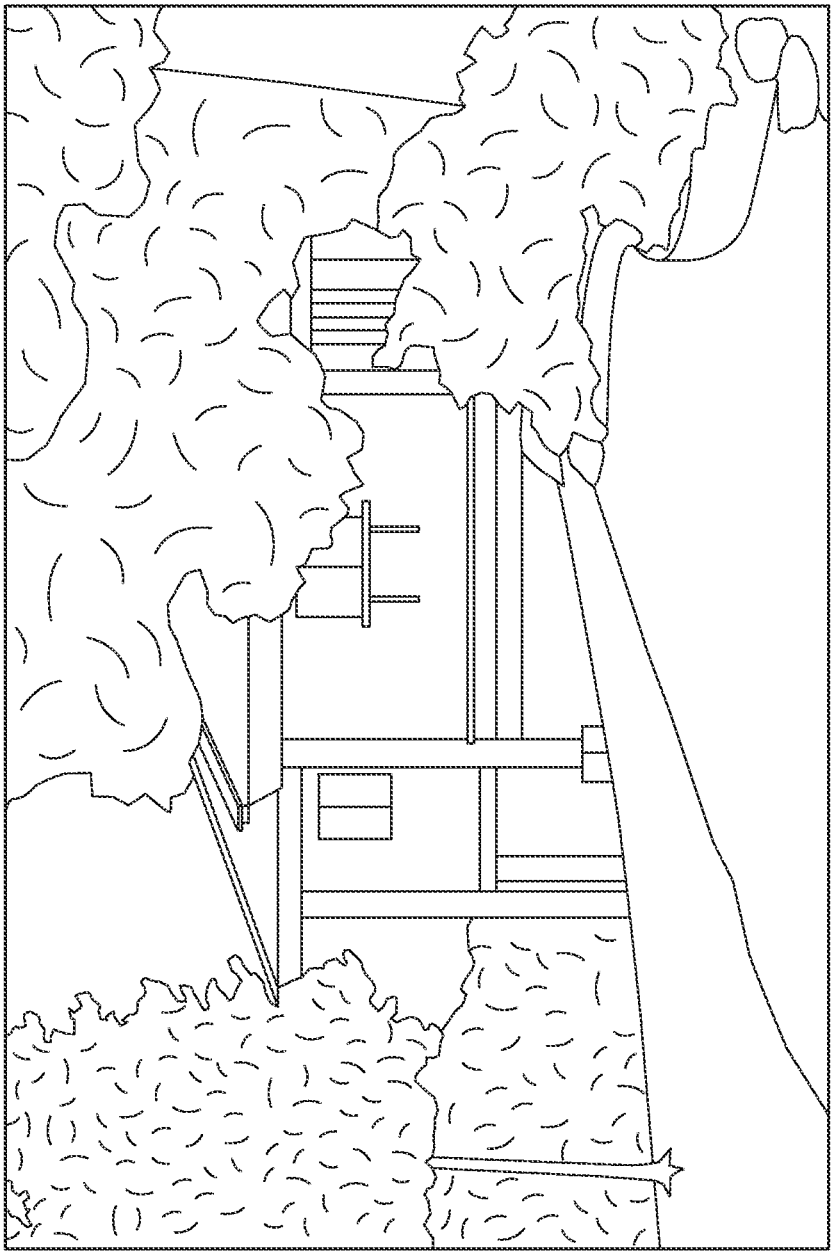

FIG. 11C

Mann looked closely at the bare minimum of what Franklin would need and what would meet local building code requirements. He chose a mandala shape a form commonly found in Buddhist and Hindu art. The house has an identical design on all four sides, which simplified construction.

A small basement under the central core stabilizes the structure, while the four peripheral building segments are supported on posts.

Mann looked closely at the bare minimum of what Franklin would need and what would meet local building code requirements. He chose a mandala shape a form commonly found in Buddhist and Hindu art. The house has an identical design on all four sides, which simplified construction

NETWORK SITE TAG BASED DISPLAY OF IMAGES

CROSS REFERENCE TO RELATED APPLICATIONS

This application is a continuation of, and claims priority to, U.S. patent application Ser. No. 13/472,409, filed May 15, 2012, which claims priority to provisional patent application Ser. No. 61/567,012, filed Dec. 5, 2011, each of which is incorporated herein in its entirety by this reference thereto.

BACKGROUND OF THE INVENTION

Technical Field

The invention relates to the interactive organization and presentation of content within a semi-supervised expert domain. More particularly, the invention relates to the consistent presentation of content and passive relevance determination of content relationship in an on-line commerce system.

Description Of The Background Art

Electronic commerce, commonly known as e-commerce, eCommerce, or e-comm, refers to the buying and selling of products or services over electronic systems such as the Internet and other computer networks. However, the term may refer to more than just buying and selling products online. It also includes the entire online process of developing, marketing, selling, delivering, servicing, and paying for products and services.

The amount of trade conducted electronically has grown extraordinarily with widespread Internet usage. The use of commerce is conducted in this way, spurring and drawing on innovations in electronic funds transfer, supply chain management, Internet marketing, online transaction processing, electronic data interchange (EDI), inventory management systems, and automated data collection systems. Modern electronic commerce typically uses the World Wide Web at least at one point in the transaction's life-cycle, although it may encompass a wider range of technologies such as e-mail, mobile devices, and telephones as well.

A large percentage of electronic commerce is conducted entirely in electronic form for virtual items, such as access to premium content on a website, but mostly electronic commerce involves the transportation of physical items in some way. Online retailers are sometimes known as e-tailers and online retail is sometimes known as e-tail. Almost all big retailers are now electronically present on the World Wide Web.

Electronic commerce that takes place between businesses is referred to as business-to-business or B2B. B2B can be open to all interested parties, e.g. commodity exchange, or limited to specific, pre-qualified participants (private electronic market). Electronic commerce that takes place between businesses and consumers, on the other hand, is referred to as business-to-consumer or B2C. This is the type of electronic commerce conducted by companies such as Amazon.com. Online shopping is a form of electronic commerce where the buyer is directly online to the seller's computer, usually via the Internet. There is no intermediary service involved. The sale or purchase transaction is completed electronically and interactively in real-time, such as in Amazon.com for new books. However in some cases, an intermediary may be present in a sale or purchase transaction such as the transactions on eBay.com.

Online shopping has evolved to the point that a specific user experience is often provided for particular types of goods. Online shopping also includes recommendations, user reviews, and other social aspects of the goods listed on a particular site. Unfortunately, there is no way for a user to make much sense of the listed items because no thought goes into arranging and presenting the items in a meaningful way relative to each other across categories, nor is expert advice associated with the online sale of goods, nor is user interaction with the goods during their presentation considered in subsequent presentation of the goods. Further, most online commerce is presented in a format that belongs to an earlier era of the Internet, and that is not particularly well adapted for modern tablet and handheld devices.

SUMMARY OF THE INVENTION

The presently preferred embodiment of the invention comprises a platform that allows experts, in this embodiment home improvement professionals, to upload their portfolios, i.e. content such as photos, videos, text, and sound, to a publicly available resource, such as a Web browser accessible, network based commerce system. This content is uploaded by using self-service tools. Users may then browse the content, such as photos, by room, style, and metro area. Uniquely, the content, in this example the photos, is arranged in collections that are in part passively sorted, based upon user relevance.

Further, an embodiment of the invention presents tags on objects in photos for which there is, for example, more information, price information, and/or product information. In the case of a movable display device, the tags on the photo can simulate the physics of real tags, for example they can move back and forth when the device is shaken.

BRIEF DESCRIPTION OF THE DRAWINGS

FIG. 1b is a further screen shot showing products listed in the photo ad of FIG. 1a;

FIG. 3 is a screen shot showing idea book recommendations according to the invention;

FIG. 5a is a screen shot showing the suggesting of items related to an item that is being shown according to the invention;

FIG. 5b is a screen shot showing a Web site linked to from the photo in the screen shot of FIG. 5a;

FIG. 8 is a screen shot of a photo stream page for an individual photo, as shown on a handheld device, according to the invention;

FIG. 9 is a screen shot of a profile page, as shown on a handheld device, according to the invention;

FIGS. 11a-11f are screen shots that show pages as displayed with snapping (FIGS. 11a and 11b) and smart layout (FIG. 11c) according to the invention;

FIG. 11d is a screen shot that shows scrolling without snapping between the pages shown in FIGS. 11a and 11b;

FIG. 11e is a screen shot that shows scrolling without snapping between the page shown in FIGS. 11b and 11c;

FIG. 11f is a screen shot that shows display of the page of FIG. 11c without the use of the smart layout feature of the invention.

DETAILED DESCRIPTION OF THE INVENTION

Figure 1A:
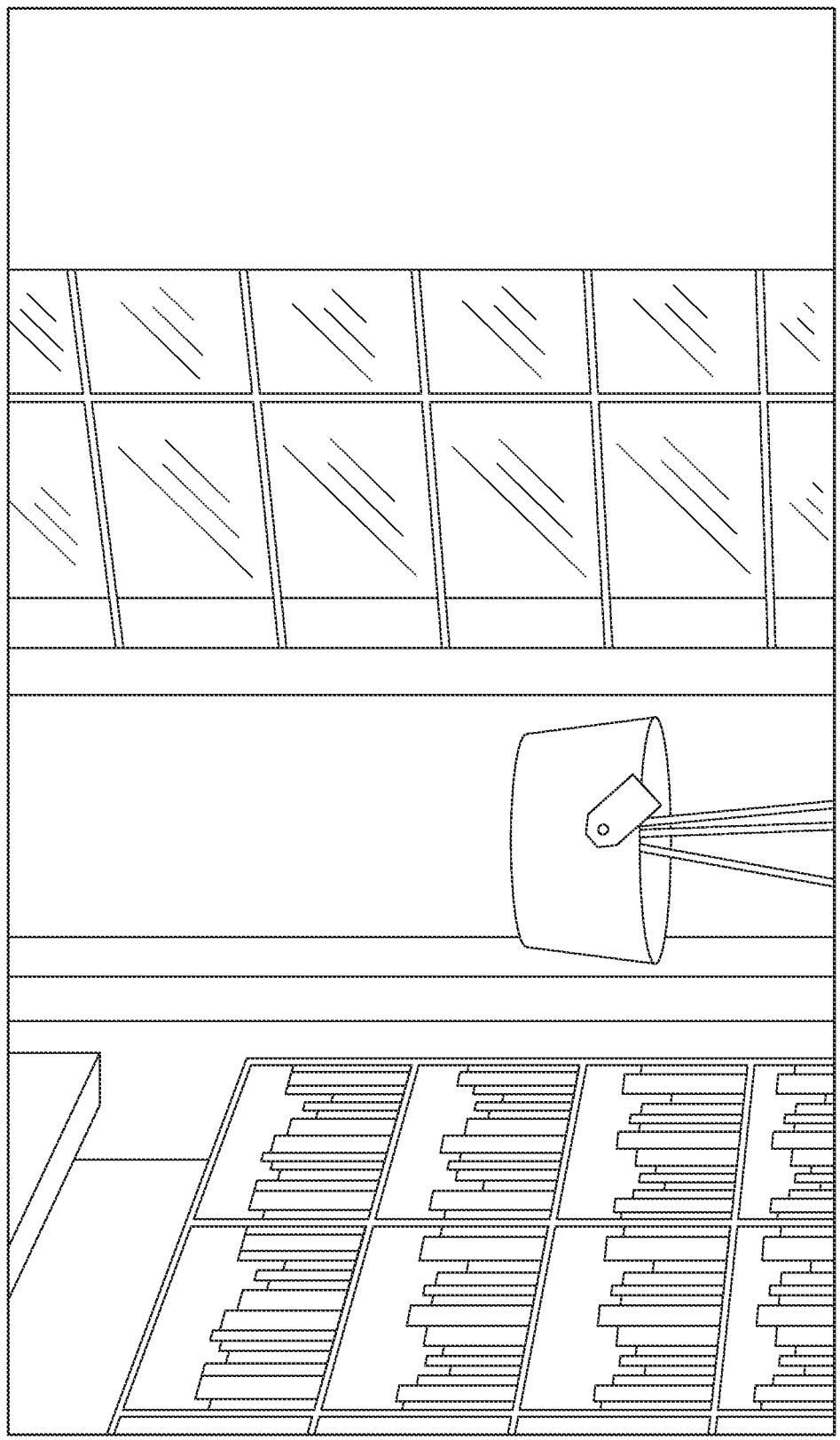
FIG. 1a is a screen shot showing a photo ad according to the invention.

The presently preferred embodiment of the invention comprises a platform that allows experts, in this embodiment home improvement professionals, to upload their portfolios, i.e. content such as photos, videos, text, and sound, to a publicly available resource, such as a Web browser accessible, network based commerce system. This content is uploaded by using self-service tools. Users may then browse the content, such as photos, by room, style, and metro area. Uniquely, the content, in this example the photos, is arranged in collections that are in part passively sorted, based upon user relevance. This is accomplished in an embodiment by providing users with tools for creating idea books. The idea books are produced when a user selects various photos in various categories for inclusion in their idea books.

The system monitors the user selection process to determine relationships between items within photos in selected categories. The system collates this information across the many users of the system and, thus, passively determines user relevance. For example, in the embodiment concerning residential interior design, photos may be organized in categories that correspond to the different rooms of a house, such as the bedroom, living room, etc. A user may proceed at the room level, adding design elements, furniture, and the like to an idea book for a particular room, for example the living room. Here, there are many styles available to the user, such as classic, modern, European, Asian, and the like. The user's idea book selections are that user's opinion as to design elements that may coordinate with each other, even if they are selected from a variety of styles. The system makes note of these connections for each user and, in the process, identifies user-based groupings that may then lead to new categories and/or suggestions to other users.

Further, this process may be applied across rooms, as well as styles. In this way, user idea book selections across a user population are used to identify trends and tastes. This information can be used to create recommendations, to reorganize content within categories, to create new categories, and to alert design experts and vendors with regard to user preferences.

In addition to passive determination of user relevance, an embodiment of the invention also allows user interaction with the content. For example, users may tag objects in photos and this information can be processed, as above for passive interactions, to organize and reorganize the presentation of content.

Photos may also be tagged editorially with links to information about the tagged objects. For example, a tag may provide a link to an expert discussion of the tagged object or to an expert in connection with the expert's design services, a link to other objects that are related aesthetically to the object or that are thematically consistent with the object, and/or a link to a distributor or manufacturer Website to facilitate commerce in connection with the tagged object and/or related objects. Further, the user may link to additional views of the tagged object, obtain options, select different coverings for the object, such as a different type of upholstery, which is then displayed in the photo, and save these objects in the user's idea book.

Thus, another unique aspect of the invention is the use of photo-based advertising. In contrast to banner ads, sidebars ads, pop-ads, and the other that populate the Web, the invention herein provides collections of photos that are related categorically and that are determined to be relevant by any or all of passive user interaction, user tagging, and expert supervised tagging. In this embodiment of the invention, all communication is image based. Rather than have ads that pop out and grab a user's attention, often annoyingly, an embodiment of the invention presents all photos, for example, in a collection in a consistent format.

Tags

The photos in a category or grouping are of the same size and shape or similar in size and shape, the objects in the photos are all thematically and/or aesthetically related to all other photos in the category or grouping, the use of icons or tags to indicate links to additional information is consistent. Thus, the user is presented with a 'walled garden' in which the substance of each photo is the focus of the presentation, and not the use of annoying or distracting attention getting devices. In this way, each ad itself looks like each other ad in a photo stream and the user may thus direct his attention to the perceived merits of the objects within the photos, and not the format of presentation of the photos.

Due to the relevance determination, filtering to a user query is precise. If a user wants to view photos related to, for example, dens, and the user is interested in French contemporary styling, then the photo stream presented to the user is constrained to relevant content, the content is consistently presented to allow the user to concentrate on the design elements within the photos and not on the presentation of the photos, and thus make a more natural and meaningful decision when selecting objects for inclusion in the user's idea book, and the user is afforded the opportunity to link to additional information upon selecting tags within a particular photo.

In an embodiment, users are able to ask professionals questions about the photos. Both users and an editorial team can tag the photos with products. Users can save photos to collections. Users can also browse a visual directory of professional service providers.

The tags presented to the user may be of various types. For example, the shape of the tag and/or color may be used to denote different classes of information. Thus, a dollar sign shaped tag may denote a link for purposes of commerce, a question mark may denote a link for expert advice, and the like. Further, it is clear that hand held devices, such as the iPad, are becoming increasingly popular and such devices are ideally suited for use in connection with the invention herein disclosed. For example, an embodiment of the invention provides motion sensitive tags that are activated when the display device, e.g. the iPad, is moved in a particular fashion, such as by shaking. Such action can make the tags appear, make the tags disappear, animate the tags, for example where the tags move back and forth to draw attention to them. In this and other embodiments, the user may set preferences with regard to the tags, for example, if animation is desired, if particular classes of tag are to be excluded or included, and if tag selection executes a particular action, such as adding a reference to the user's idea book, or generating a purchase inquiry, and/or if tags should not be displayed at all, i.e. they may be turned off.

Thus, an embodiment of the invention presents tags on objects in photos for which there is, for example, more information, price information, and/or product information. In the case of a movable display device, the tags on the photo can simulate the physics of real tags, for example they can move back and forth when the device is shaken (see FIGS. 11a and 11b, discussed below). In such case, the tags swing around a rotation point using pendulum equations of motion, or approximate pendulum equations of motions which are more computationally efficient on small devices, such as smartphones. In an embodiment, an approximate pendulum equation of motion is:

$$\theta'' = -k\,\theta - f\,\theta' \qquad (1)$$

where:
  theta is the angle between the tag image orientation on the gravity vector, either the true gravity vector derived from the device sensors, or the apparent gravity direction derived from the image orientation;
  theta' is the angular velocity;
  theta" is the angular acceleration;
  k represents a pendulum spring coefficient; and
  f represents a damping coefficient.

In an embodiment, the gravity direction in the image plane may be computed using the device's accelerometers. The gravity direction may be the gravity vector components in the image plane, or the down direction depicted in the image if the gravity has no component in the image plane, i.e. gravity is perpendicular to the image plane. The user interacts with the tags by swinging them or tapping them. By using the device's accelerometers and an appropriate band pass filter within the device's software, a user shaking the device introduces acceleration elements and motion to the tags as if the tags where a pendulum that is being pushed/swung. Thus, the tags appear to swing side to side and/or in and out of the plane of the display. This same effect may be achieved through any other user action, such as using a sliding gesture to flip from one page to another on the display. Other embodiments of the invention provide tags that mimic such real world phenomena, for example, such as springs, e.g. tags that bounce when the device is shaken, spinners, e.g. tags that spin when the device is rotated, and animation including starbursts, explosions, avatars, and the like.

Photo Ads

A common activity for those who use the invention is browsing photo streams. Users can filter photos by style (modern, traditional), space (kitchen, bedroom), and/or specify search terms (red sofa). In this case user is looking at modern family room photos. The photo ad unit is designed to be injected seamlessly into this stream. An example is shown in FIGS. 1a and 1b.

A photo ad has several components:
  1. Promotional section contain information about the advertiser;
  2. Photo; and
  3. Products that are included in the photo.

Figure 1B:
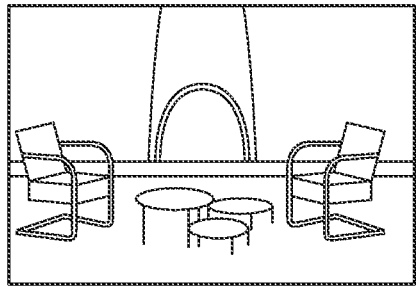
Figure 1B:
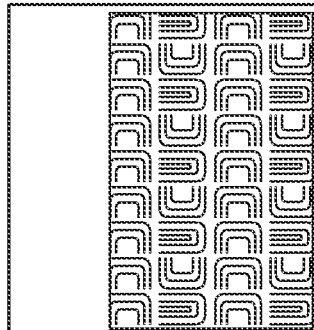
Figure 1B:
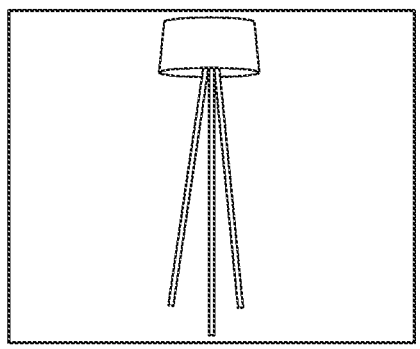

Clicking on the photo leads to a page hosted by, for example houzz.com that includes more information about the products on the photo (FIG. 1b). Users can click on "buy" button to purchase products on advertiser's Web site.

To make a photo ad appear seamless in the photo stream, it is important to select ads that are contextually relevant. This is achieved by the following:

1. Before a photo ad is run, the editorial team enter meta information about the photo, including:
    Style (modern, traditional)
    Space (kitchen, bedroom)
    Title
    Description
    Information about each product
  2. The system ad server uses contextual information to match meta information in photo ad, including:
    Style (modern, traditional) of the current photo stream
    Space (kitchen, bedroom) of the current photo stream
    Search terms (red sofa)
    Meta information of the photos in stream, including style, space, title, description, image tags, and product tags. The meta information includes both editorial and community contributed content.
    User's past activities, e.g. on Houzz.com, including style, space, search terms used before, and photos viewed. In the example shown, a matching photo ad is selected because user is browsing modern family room photos.

Product Ads

Figure 2:
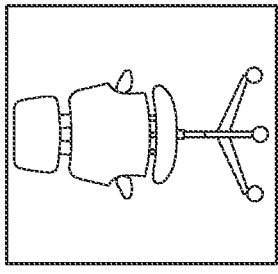
FIG. 2 is an example of product ads according to the invention.

In this ad unit, a Web site such as Houzz.com, for example, shows contextually relevant products associated with photos. An example is shown in FIG. 2.

Similar to photo ads, the ad server uses meta information in photos (both editorial and community contributed content) to find appropriate Product Ads).

Recommendations

Figure 3:
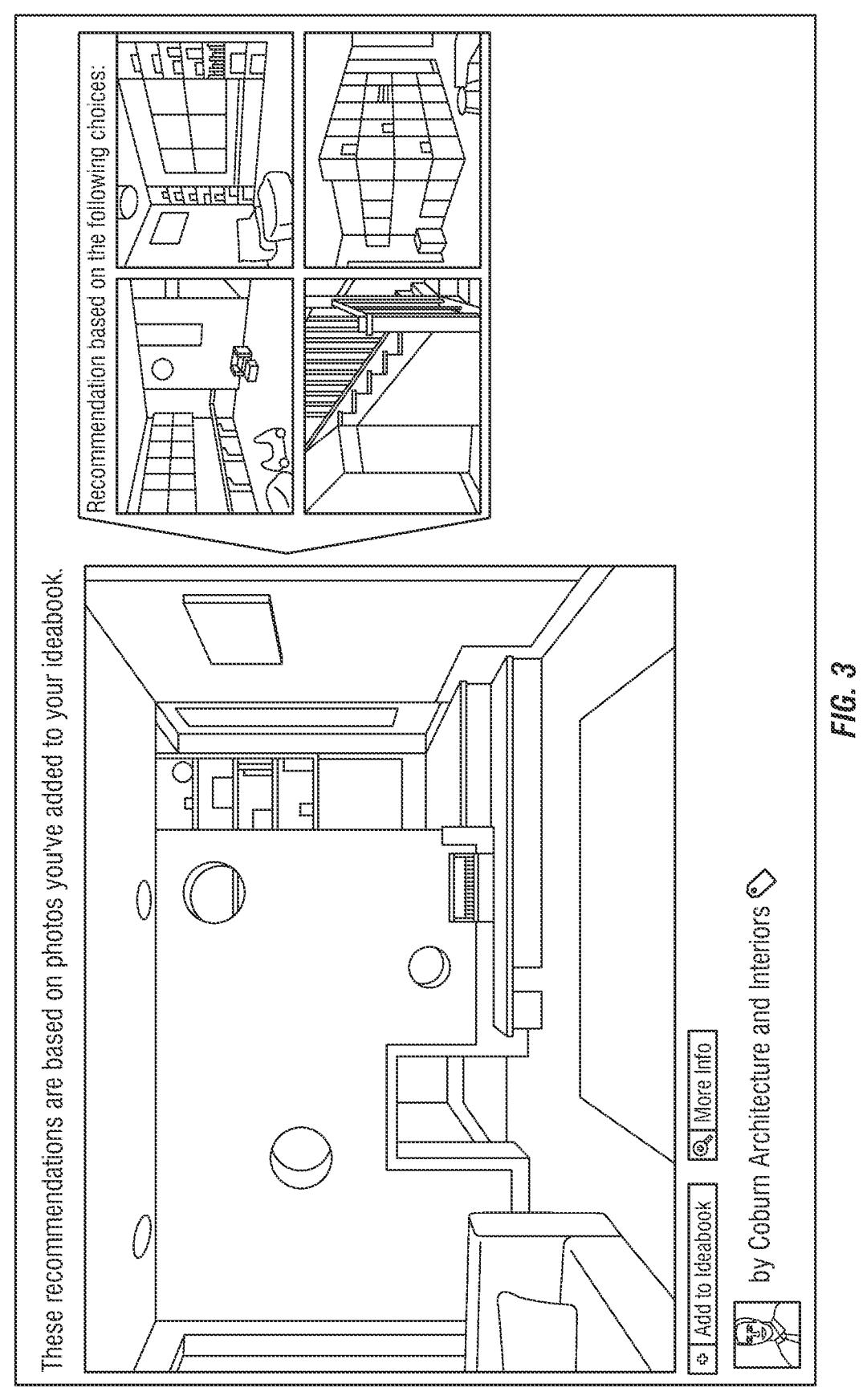

In an embodiment, users can add photos/products to their idea books. When they are doing this, they are making implicit associations between items (photos/products) in their collections (idea books) (see FIG. 3):
  1. Items in same collection share some common attributes.
  2. Items added by same user share some common attributes.

Figure 4:
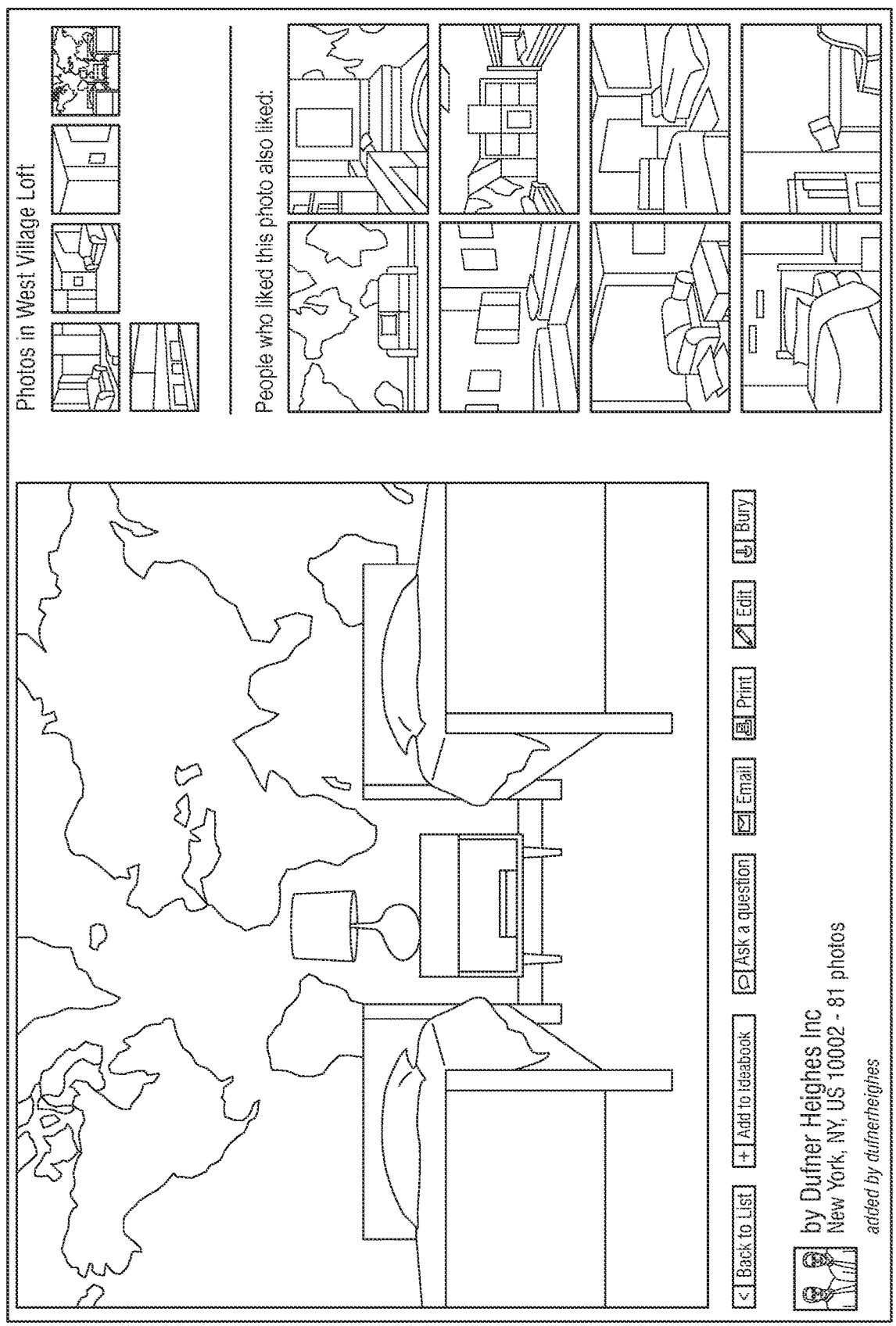
FIG. 4 is a screen shot showing the recommending of new items that a user has not seen before according to the invention.
Figure 5A:
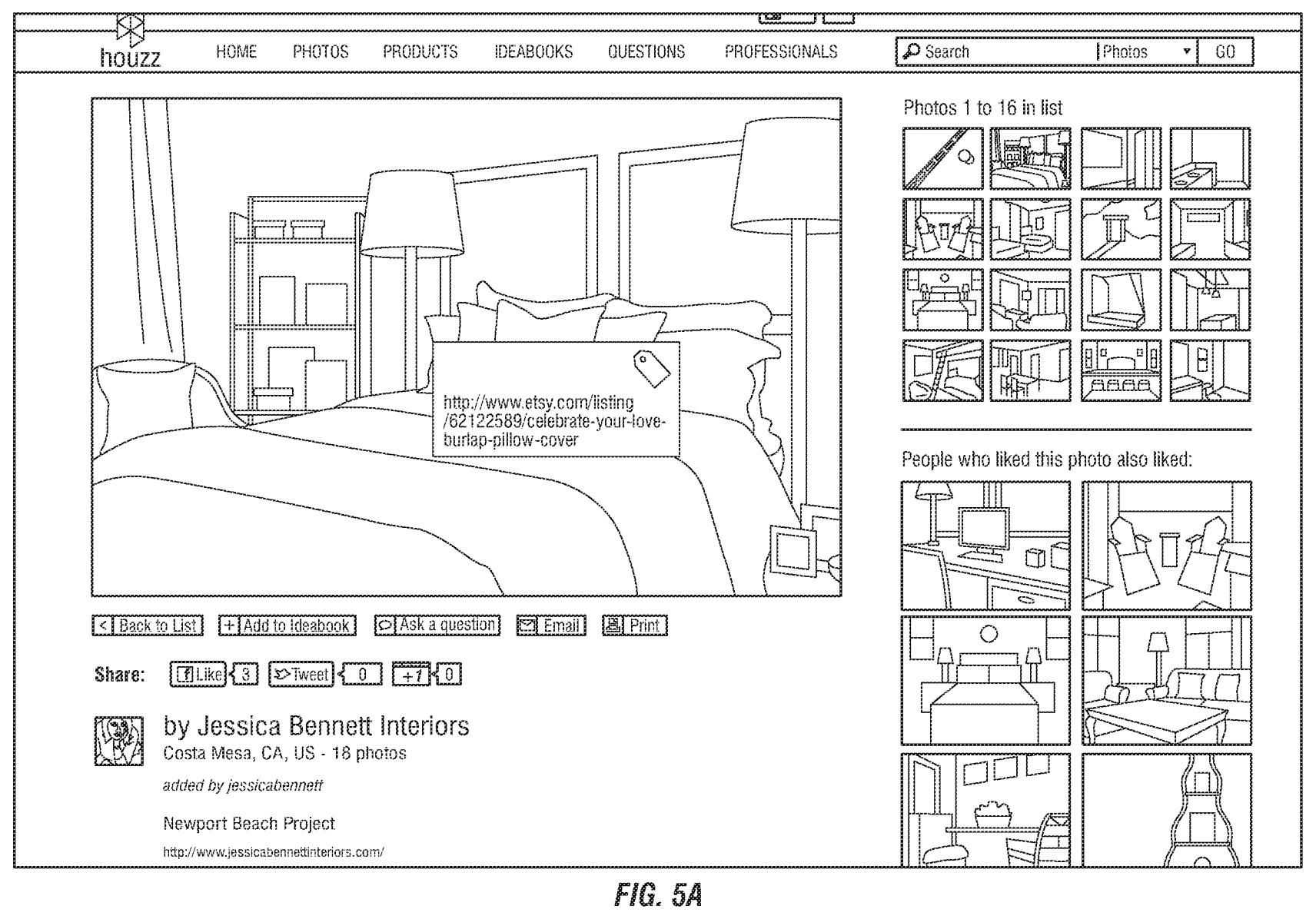
Figure 5B:
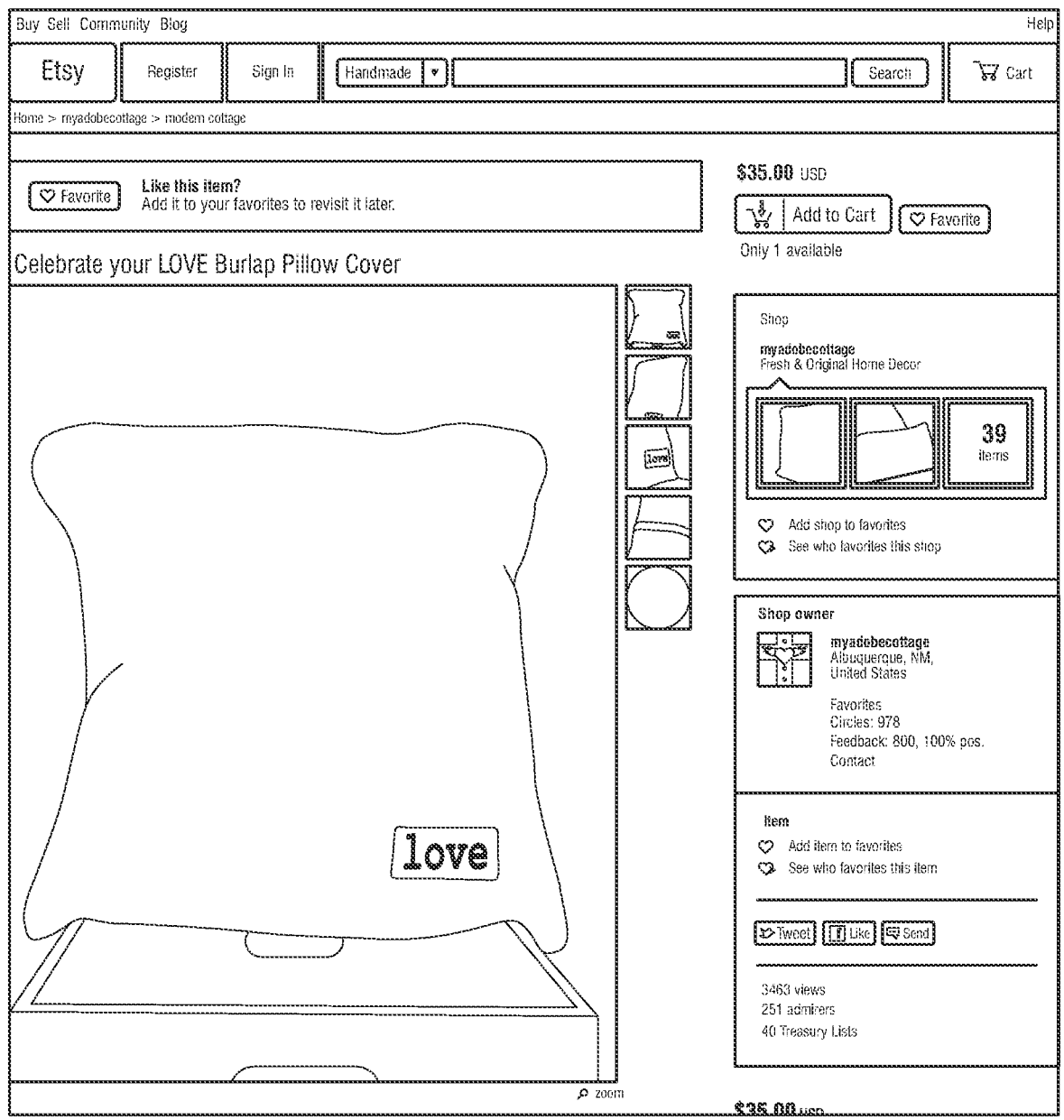

An embodiment applies collaborative filtering algorithms to find similar items. For each item, there is a set of users who have added it to one or more idea books. Given any two items, the system derives a similarity score based on the intersection of the two user sets. The system can enhance the score with a similar calculation on the collections that are associated with the items. Calculating similarity scores on every pair of items produces an item similarity matrix that can be used in different scenarios, e.g.:
  1. Recommending new items that the user has not seen before (see FIG. 4);
  2. Suggesting items related to the item that is being shown (see FIG. 5a, which shows a recommendation and FIG. 5b, which shows a product linked to a tag in the photo on the screen shot of FIG. 5a).

Because all of the implicit associations are analyzed, the system can produce interesting results, including:
  1. Related items in different categories, for example, products related to photos;

2. Identify new groups of items that strongly related to each other.

Exemplary Embodiment in a Handheld Device

Figure 6:
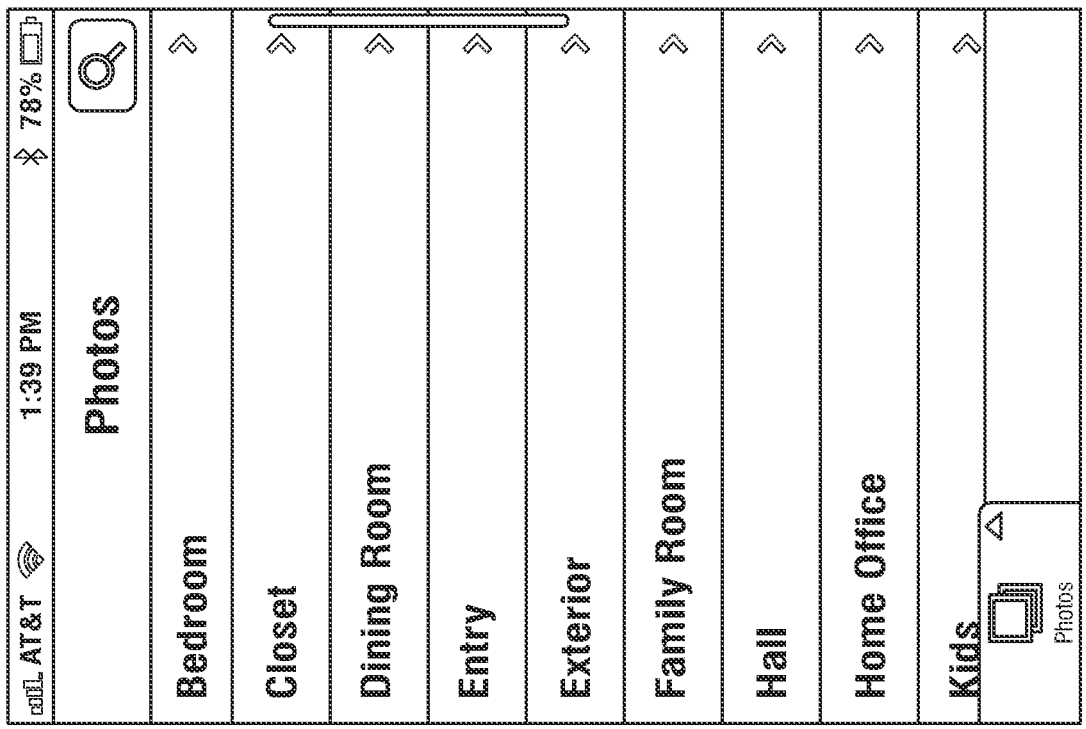
FIG. 6 is a screen shot of a photo category page, as shown on a handheld device, according to the invention.

FIG. 6 is a screen shot of a photo category page, as shown on a handheld device, according to the invention. In this embodiment, various home design related categories are shown. Other embodiments of the invention may provide appropriate categories for other domains, for example automotive, gardening, etc.

Figure 7:
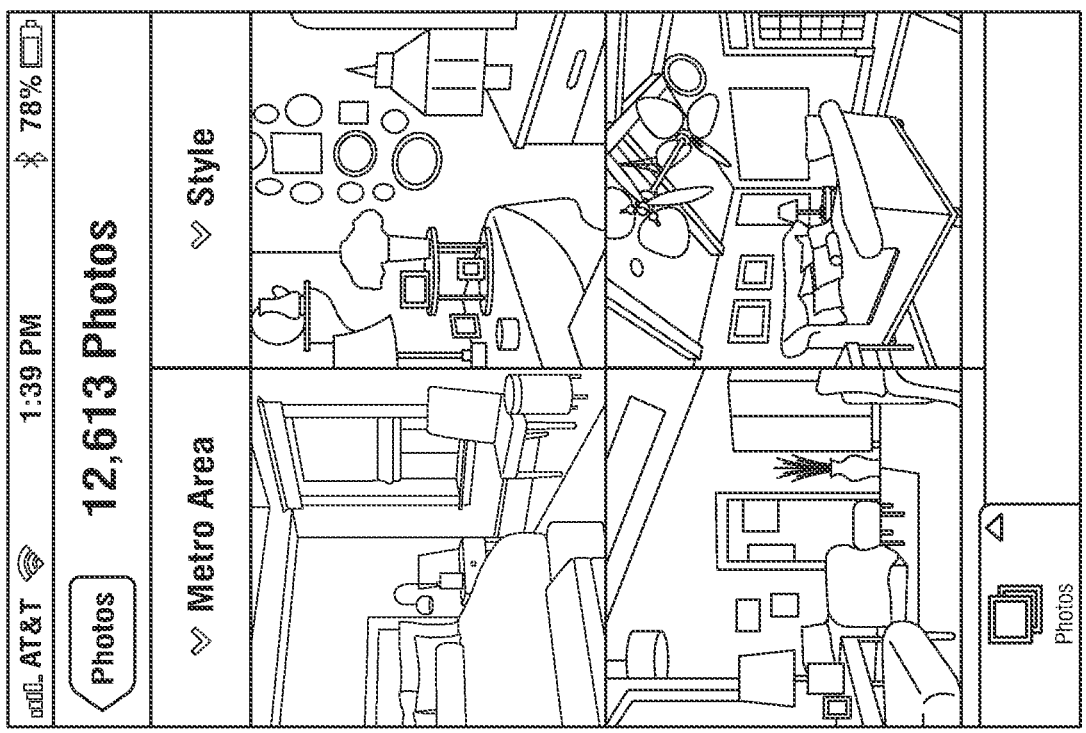
FIG. 7 is a screen shot of a photo stream page, as shown on a handheld device, according to the invention.

FIG. 7 is a screen shot of a photo stream page, as shown on a handheld device, according to the invention. Once a category is elected, a photo stream is presented. Here the user is shown two streams, i.e. Metro Area and Style. Each of the streams may be further refined by user selection of appropriate pull down menus.

Figures 8, 9:
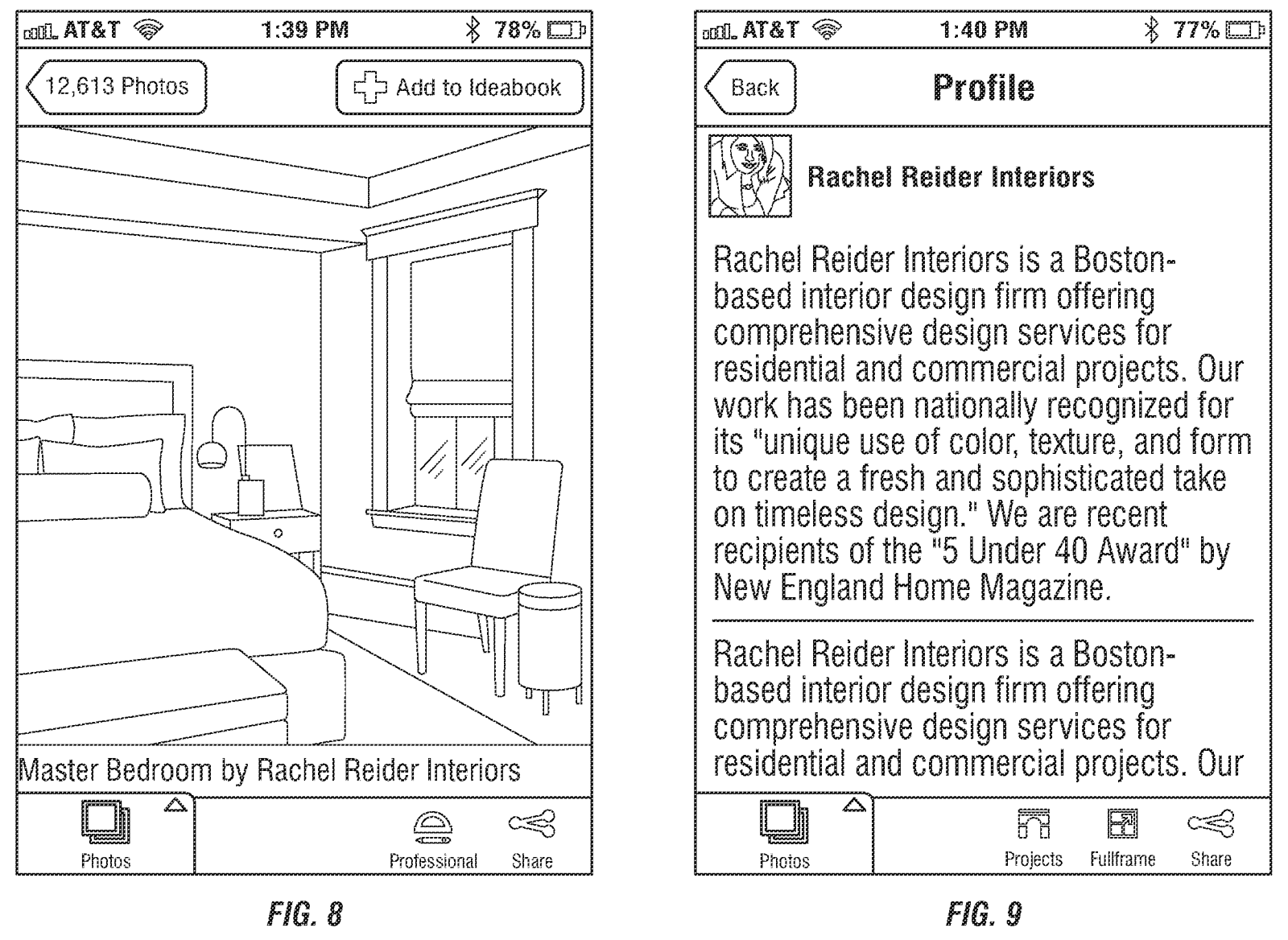

FIG. 8 is a screen shot of a photo stream page for an individual photo, as shown on a handheld device, according to the invention. This photo is selected from the photo stream of FIG. 7. Here, the user is given the option to add this photo to an idea book. The system monitors such selections, as discussed above, to refine system categorization and recommendations. The user is also provided with the option to seek information from a professional, such as the professional who prepared this photo in the photo stream as part of the professional's portfolio.

FIG. 9 is a screen shot of a profile page, as shown on a handheld device, according to the invention. If the user selected information about the professional in FIG. 8, then this information is presented to the user. The user is then presented with links to the professional's photo stream, projects, and other information.

Figure 10B:
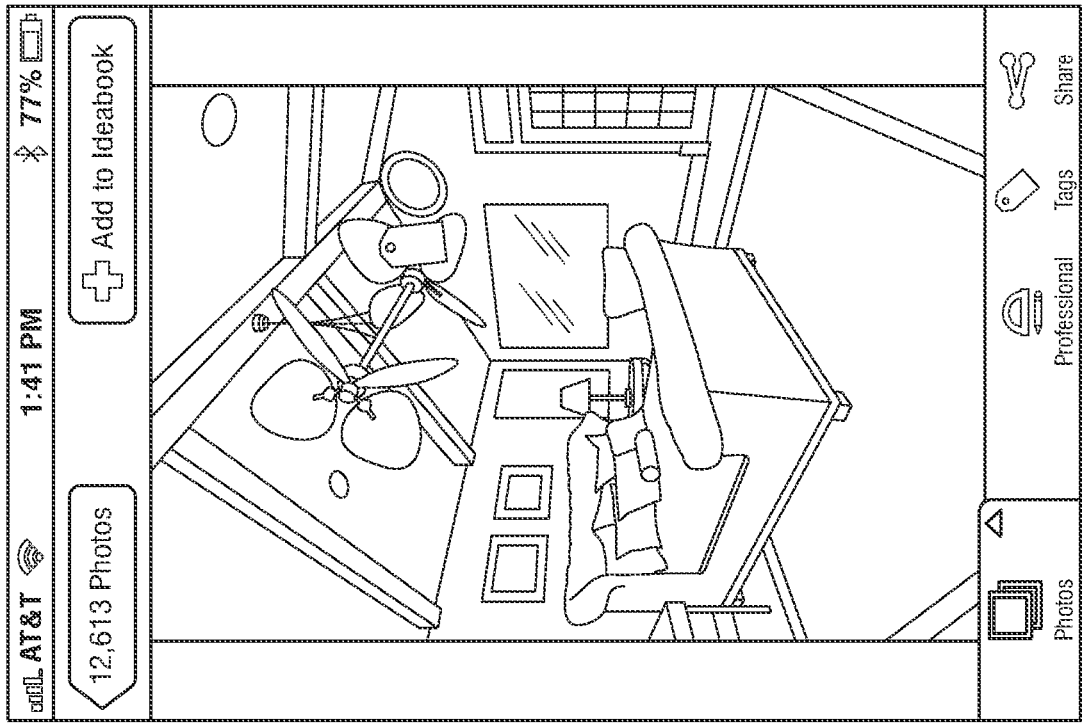
FIGS. 10a and 10b are screen shots of a photo stream page for an individual photo that has animated tags, as shown on a handheld device, according to the invention.
Figure 10A:
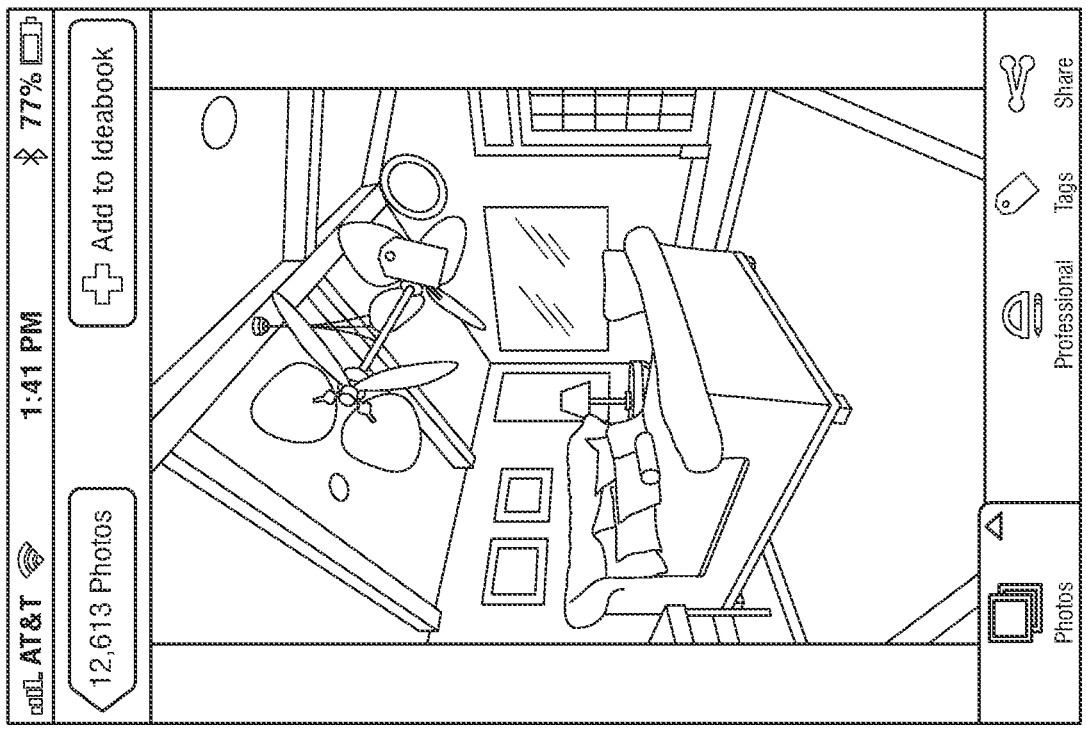

FIGS. 10a and 10b are screen shots of a photo stream page for an individual photo that has animated tags, as shown on a handheld device, according to the invention. Here, a photo of a bedroom is shown. the photo may be added to the user's idea book. The user may also turn on tags within the photo. In this example, a fan is tagged. The tag is animated to draw attention to the tagged object. In a photo having many objects, especially on a handheld device having a small display, the animated tag draws attention to objects for which additional information is available. As shown in FIG. 10a the tag has tilted to the left in response to user movement of the device. the tag swings back and forth and tilts to the right, as shown in FIG. 10b.

Figure 10C:
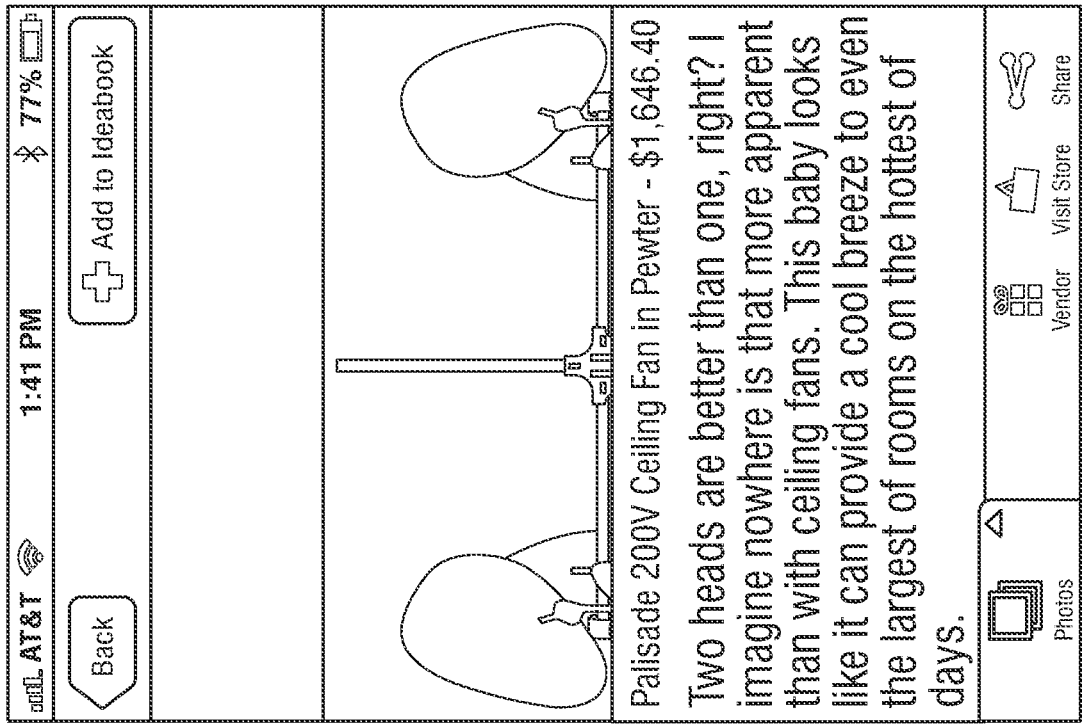
FIGS. 10c and 10d are screen shots of the photo ad page linked to the animated tags of FIGS. 10a and 10a, as shown on a handheld device, according to the invention.
Figure 10D:
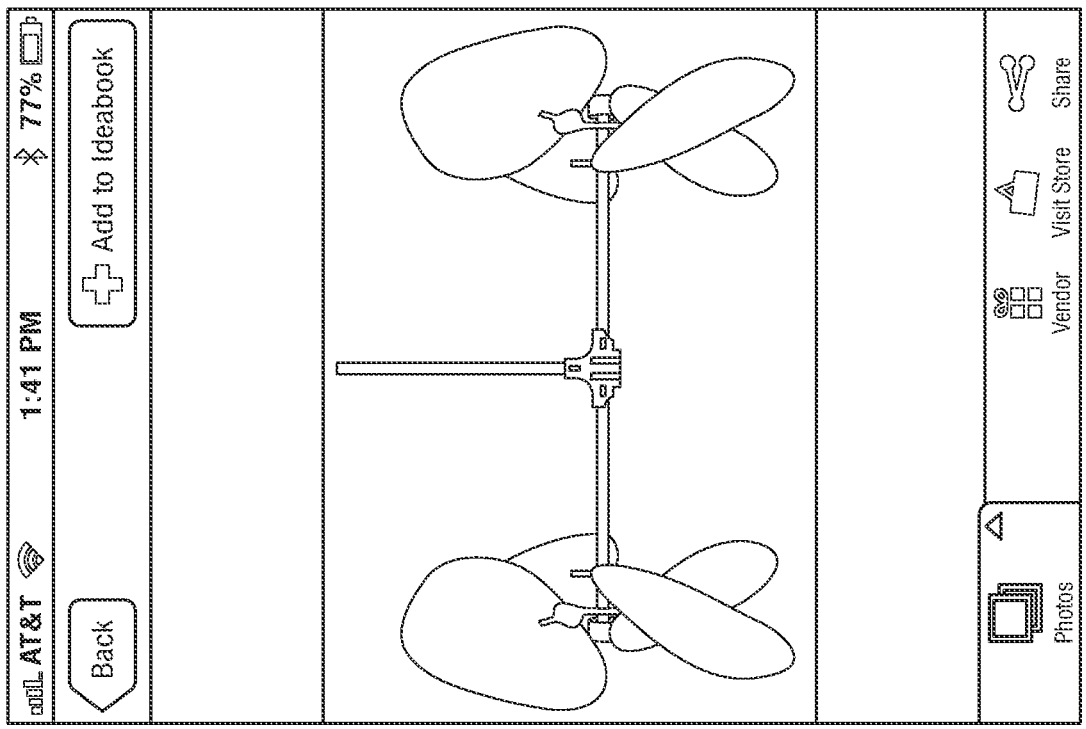

FIGS. 10c and 10d are screen shots of the photo ad page linked to the animated tags of FIGS. 10a and 10a, as shown on a handheld device, according to the invention. In FIG. 10c, the user has selected the tag for the fan of FIGS. 10a and 10b and a more detailed photo of the fan is presented. The user is also provided with links to the product vendor and an on line store if a purchase of the product is desired. In FIG. 10d, the user has selected the vendor option and more information is provided about the product.

Combined Presentation and Reading Mode Information Display

Presentation Mode vs. Reading Mode

When displaying information, such as articles, on an electronic device two distinct modes can be used.

A presentation mode typically consists of slides. Each slide contains some information and stands out on its own. One moves through the presentation by moving from slide to slide. The navigation is made simple by not needing to position each slide when reading; rather each slide occupies the entire display and is formatted to fit well in the display. A simple gesture, such as a button press or finger swipe, navigates the user to the next slide. In presentation mode there is no continuity, each slide is presented, typically occupying the entire display, and is whole in terms of content and self standing.

In a reading mode, that is typically employed by Web sites presented in a Web browser. Continuous information is displayed and the user can navigating by continuously scrolling down the display. Continuous scrolling provides continuity in the information presentation, the user never loses context of what was before what is on the screen and can see what is next. This display mode, however, lacks the visual impact of a slide mode. That is, the information can not be accurately positioned and laid out on the screen because it continuously scrolls. It also lacks the simplicity of a discrete event to move from slide to slide. Rather, the user is left with the burden of positioning the information on screen.

Accordingly, an embodiment of the invention provides a way to get the best of both worlds, a slide mode in a continuous scroll reading display. This is achieved in two steps:

1. A layout step identifies information units. These are groups of information items that relate to each other and which would be logical to display together. These information units are then laid out in such a way as to occupy screen full units as much as possible.

2. A presentation step which consists of a scrolling display and a smart snapping of the scroll position to logical location in the information unit display. In this way, the presentations appears as if the device is guessing what unit the user is looking at and positioning that information unit optimally on the screen.

Information Unit Identification

An information unit consists of items in the underlying text that can be grouped together, such as an image and its caption, paragraphs of text in the same text section or subsection, a title and its sub-title, author info, etc.

Information Unit Layout

When deciding on the layout of the unit, the screen size is brought into consideration. Some elements in the unit, such as photos, can typically be scaled and presented at several sizes. Other units, such as text, tend to have more of a fixed size, but their size can be controlled indirectly by setting the text column width, spacing between columns, spacing between paragraphs, etc.

When a unit has a photo and text, if the photo can be reduced in size such that the entire text that relates to it fits the screen, together with the image, the image is scaled down. The image is only scaled down up to a minimum presentation size. If the minimum size is not sufficient so that the text and image fit the screen together, the image is presented in the maximum scaling. This makes the unit fit an entire screen if possible, thus preserving an appealing visual impact by not down scaling images too much, and only scaling them down if by doing so the added benefit of having the text associated with it be visible in its entirety on-screen.

Presentation Snapping

When the user scrolls, a physics engine is used to move the screen and provide more realistic feedback. Using a physics engine in scrolling is common practice today and was pioneered by Apple in the iOS operating system on the iPhone. Usage of the physics system enables setting snap point, i.e. modifying the calculated target end points of the physics engine to more meaningful positions in the information flow, thus providing a natural snap feeling.

The target position of the scroll rest is set to the start of information unit, thus when the user flicks his finger on the screen, the scroll stops with an information unit at the top of the screen. Due to the layout the information unit fills the screen if possible. When the user continuously drags the scroll view, it is positioned where the user moved it to, providing a continuous scroll experience similar to regular scrolling presentations. No snapping is performed in this case.

Distinguishing between when to do snapping and when not to do snapping provides both the presentation feel, positioning the information feed at exact information units on the screen, and the continuous reading/scrolling feel enabling the user to position the information feed where he wants. When an information unit is too large to fit an entire screen, snapping positions inside the information unit are used, based on the structure of the information unit.

Examples are:
Top of a photo;
Top of a text description; and
Any break in a text description, such as sections, paragraphs, etc.

These in-information unit breaks are not used when the information unit fits inside the screen. This gives a slide feeling to the information presentation.

FIGS. 11a-11f are screen shots that show pages as displayed with snapping (FIGS. 11a and 11b) and smart layout (FIG. 11c) according to the invention. It can be seen that snapping provides a coherent and graceful transition between displays unit, i.e. pages, while smart layout provides a more proportional and balanced presentation of images and text relative to each other.

Figure 11B:
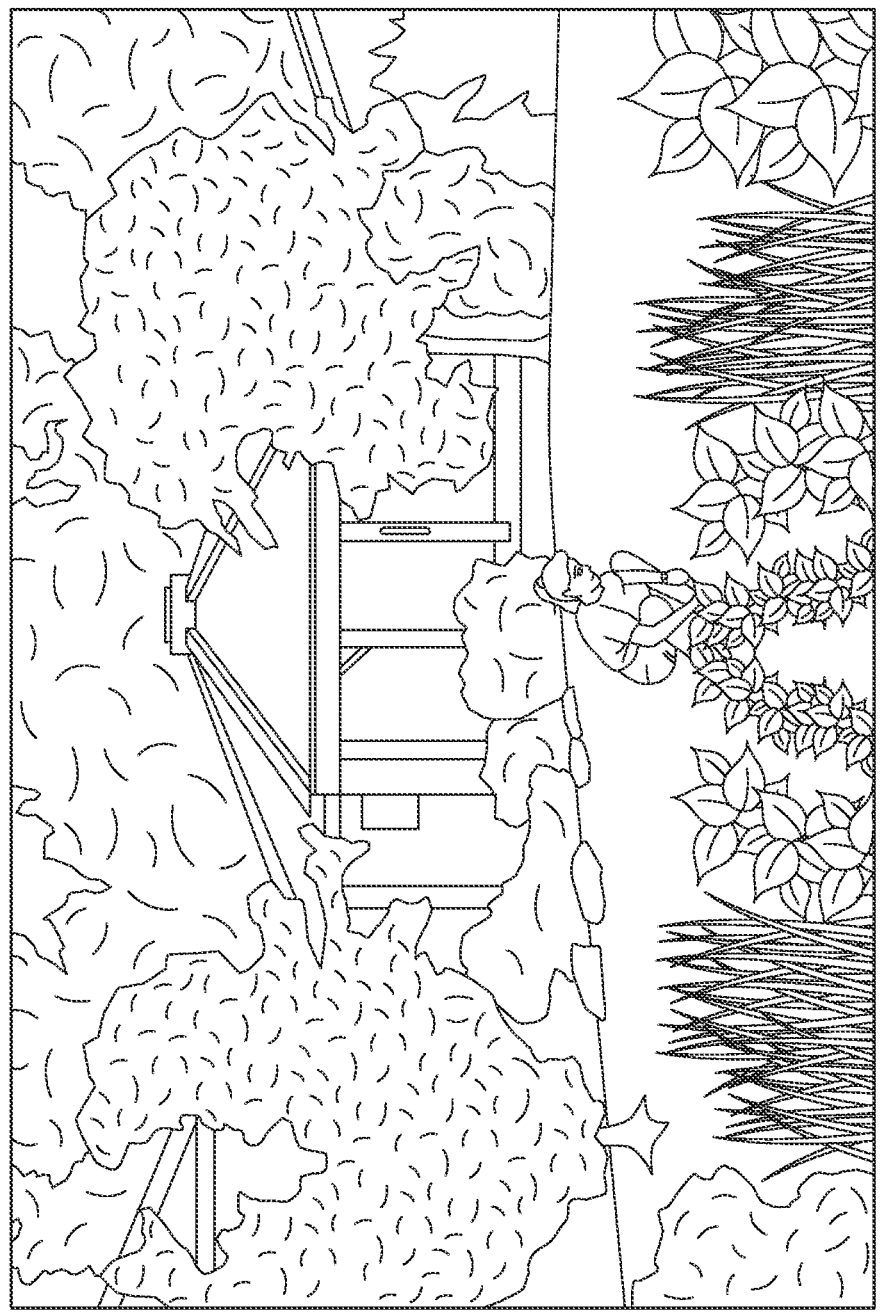
Figure 11D:
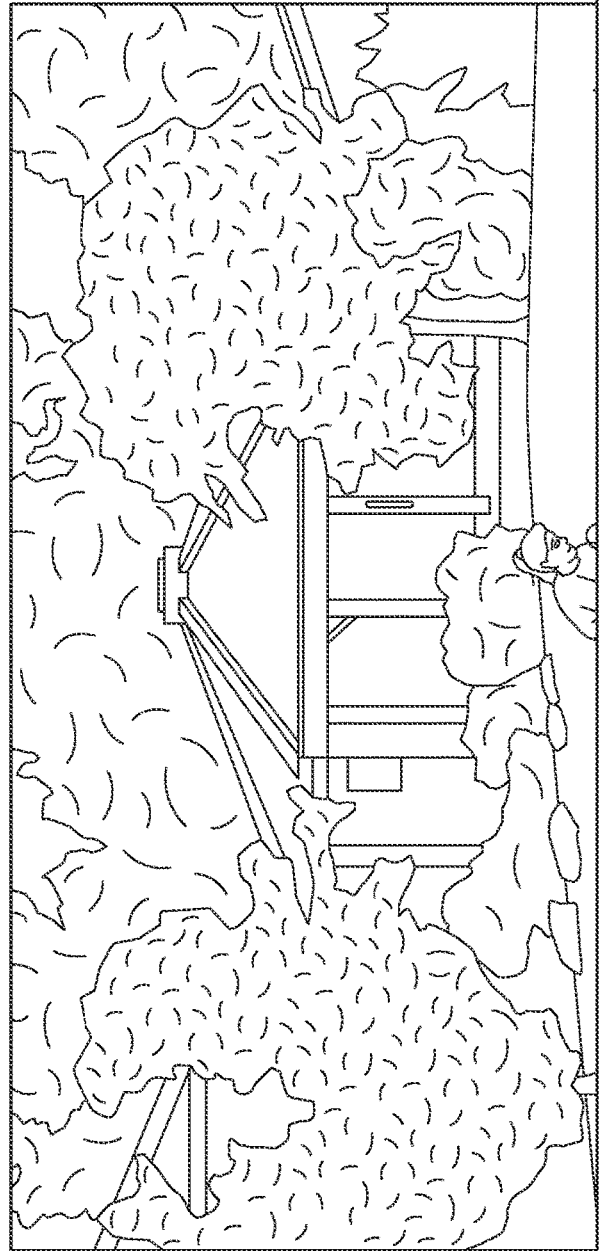
Figure 11E:
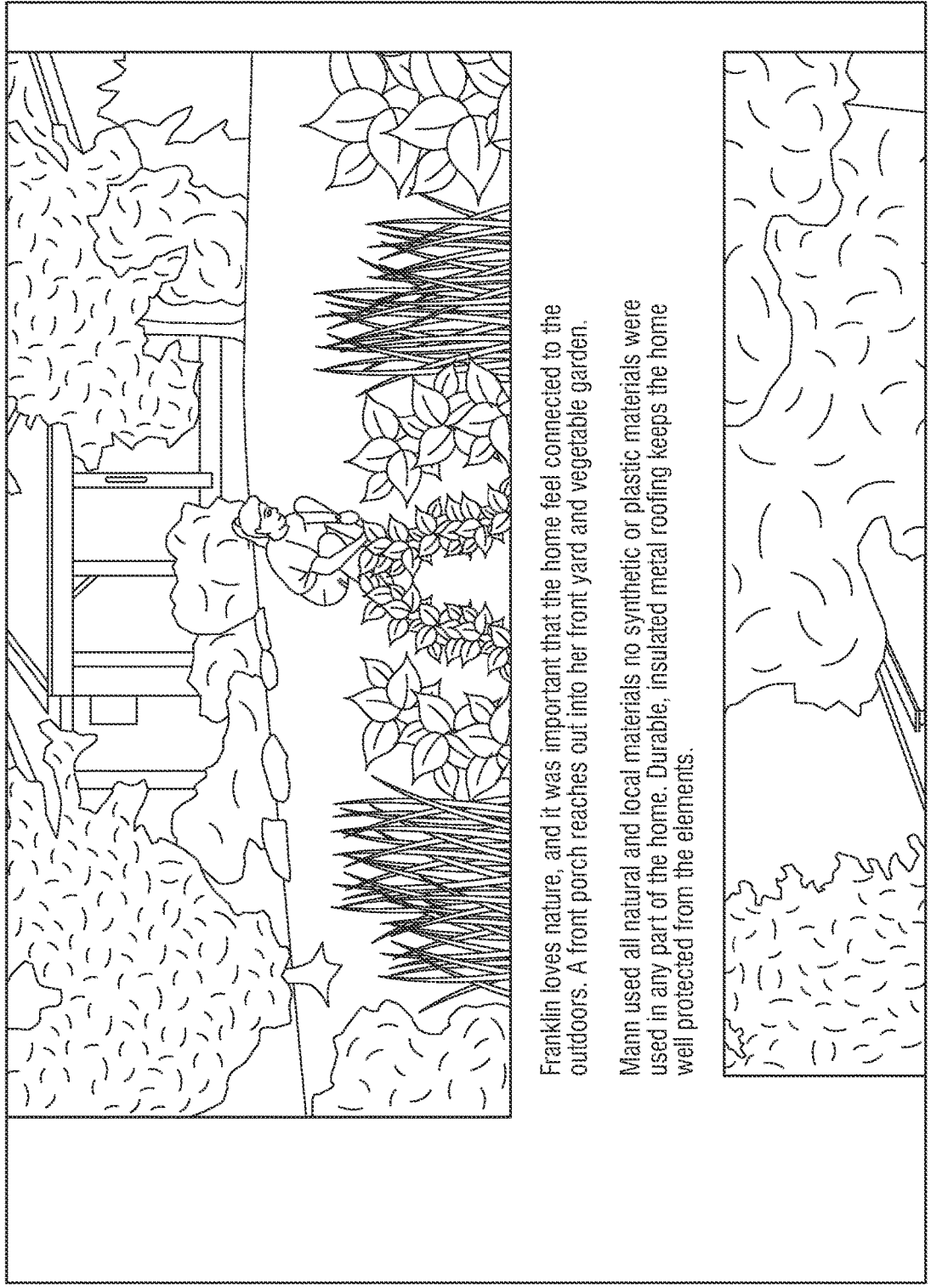
Figure 11F:
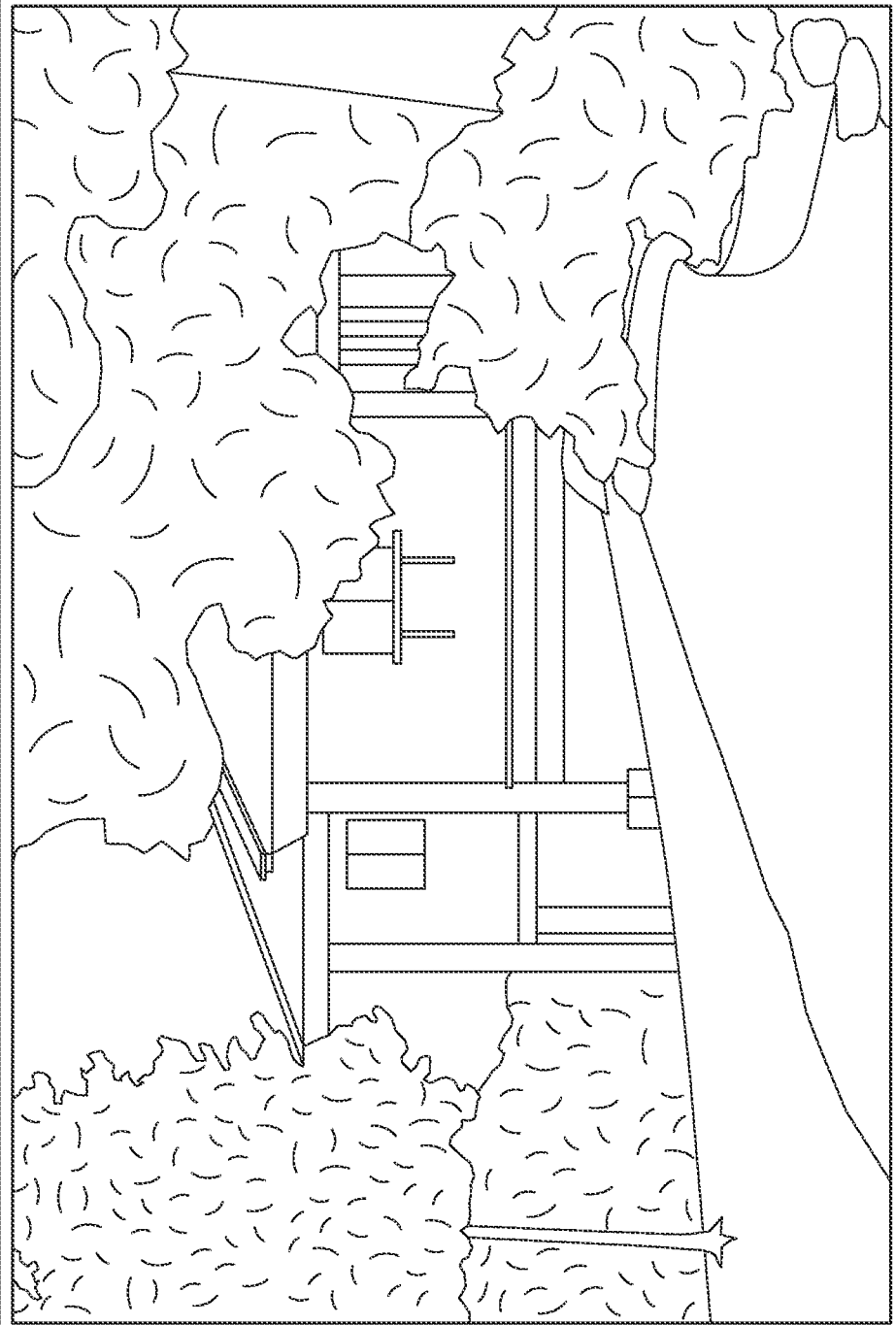

In contrast, FIG. 11d is a screen shot that shows scrolling without snapping between the pages shown in FIGS. 11a and 11b; FIG. 11e is a screen shot that shows scrolling without snapping between the page shown in FIGS. 11b and 11c; and FIG. 11f is a screen shot that shows display of the page of FIG. 11c without the smart layout. As can be seen, page transitions are awkward and nonsensical without the use of snapping, and here is no way to fit both the photo and its caption/referring text in the same screen without the use of smart layout.

Computer Implementation

Figure 12:
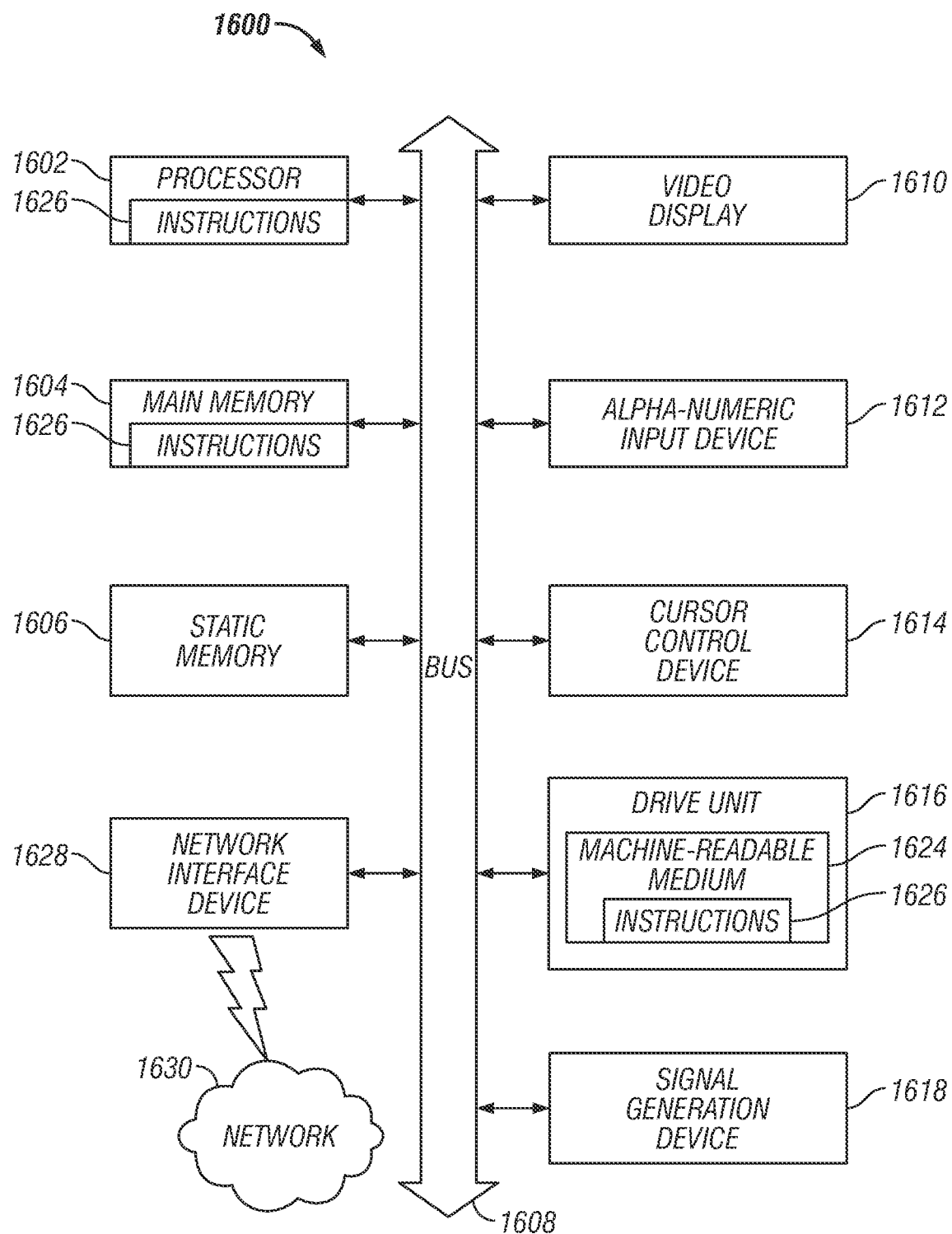
FIG. 12 is a block schematic diagram of a machine in the exemplary form of a computer system within which a set of instructions for causing the machine to perform any one of the foregoing methodologies may be executed.

FIG. 12 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus comprising:
a display device;
one or more inertial sensors;
a processor configured to perform operations comprising:
display, on the display device, a user interface including a network site image from a network site, the network site image depicting a plurality of physical objects;
determine a true gravity vector using the one or more inertial sensors to detect true gravity;
determine image plane gravity by generating a vector component of the true gravity vector in an image plane of the network site image and store the vector component as the image plane gravity;
display, in the user interface, an editorial tag depicted as hanging from one of the plurality of physical objects towards the image plane gravity;
generate, in the user interface, a user tag depicted as hanging from another of the plurality of physical objects towards the image plane gravity, the user tag generated by a browsing user of the network site, wherein the user tag is visually distinguishable from the editorial tag on the network site image;

detect, using the one or more inertial sensors, movement of the apparatus while the network site image is displayed on the display device;

determine that an updated vector component of the true gravity vector in the image plane is zero due to the movement causing the image plane to be perpendicular to the true gravity vector;

in response to the updated vector component being zero, set the image plane gravity from the component of the true gravity vector in the image plane to a bottom of the network site image as displayed on the display device; and in response to the movement, animate the editorial tag and the user tag as undergoing pendulum motion with respect to image plane gravity as set to the bottom of the network site image due to the updated vector component being zero.

2. The apparatus of claim 1, wherein the editorial tag links to an additional network site, and wherein the user tag links to another network site that is different than the network site and also different than the additional network site to which the editorial tag links.

3. The apparatus of claim 2, wherein the additional network site is a manufacturer website.

4. The apparatus of claim 3, wherein a link to the another network site is submitted to the network site by the browsing user of the network site.

5. The apparatus of claim 1, wherein the network site includes user preferences that specify whether editorial tags and/or user tags are to be excluded or included for display on the network site.

6. The apparatus of claim 1, wherein the operations further comprise: animate the editorial tag and the user tag as undergoing pendulum motion using:

$$\theta'' = -k\theta - f\theta'$$

and where:
theta is an angle between an image orientation of a given tag and the image plane gravity,
theta' is angular velocity,
theta'' is angular acceleration,
k is a pendulum spring coefficient, and
f is a damping coefficient.

7. The apparatus of claim 1, wherein the operations further comprise:

detect, using the one or more inertial sensors, further movement of the apparatus while the network site image is displayed on the display device;

determine that a further updated vector component of the true gravity vector in the image plane is non-zero due to the further movement causing the image plane to not be perpendicular to the true gravity vector;

in response to the further updated vector component being non-zero, set the image plane gravity from the bottom of the network site image as displayed on the display device to the further updated vector component of the true gravity vector in the image plane; and animate the editorial tag and the user tag as spinning toward image plane gravity as set to the further updated vector component.

8. The apparatus of claim 1, wherein editorial tags displayed on the network site have a different color or shape than users tags displayed on the network site.

9. The apparatus of claim 1, the operations further comprising:

receive selection of the editorial tag depicted as hanging from the one of the plurality of physical objects; and display, in the user interface, similar items that are similar to the one of the plurality of physical objects.

10. The apparatus of claim 9, wherein the similar items have been categorized, on the network site, as being aesthetically similar to the one of the plurality of physical objects.

11. The apparatus of claim 1, wherein the one or more inertial sensors comprises an accelerometer.

12. A method comprising:

displaying, on a client device, a user interface including a network site image from a network site, the network site image depicting a plurality of physical objects;

determining a true gravity vector using one or more inertial sensors of the client device to detect true gravity;

determining image plane gravity by generating a vector component of the true gravity vector in an image plane of the network site image and storing the vector component as image plane gravity;

displaying, in the user interface, an editorial tag depicted as hanging from one of the plurality of physical objects towards the image plane gravity;

generating, in the user interface, a user tag depicted as hanging from another of the plurality of physical objects towards the image plane gravity, the user tag generated from a browsing user of the network site, wherein the user tag displayed on the network site image is visually distinguishable from the editorial tag displayed on the network site image;

detecting, using the one or more inertial sensors of the client device, movement of the client device while the network site image is displayed on the client device;

determining that an updated vector component of the true gravity vector in the image plane is zero due to the movement causing the image plane to be perpendicular to the true gravity vector;

in response to the updated vector component being zero, setting the image plane gravity from the component of the true gravity vector in the image plane to a bottom of the network site image as displayed on the client device; and in response to the movement, animating the editorial tag and the user tag as undergoing pendulum motion with respect to image plane gravity as set to the bottom of the network site image due to the updated vector component being zero.

13. The method of claim 12, further comprising:

animate the editorial tag and the user tag as spinning toward image plane gravity in response to the client device being physically rotated.

14. The method of claim 12, wherein the editorial tag displayed on the network site have a different color or shape than the users tag displayed on the network site.

15. A non-transitory machine-readable medium embodying instructions that, when executed by a machine, cause the machine to perform operations comprising:

displaying, on a client device, a user interface including a network site image from a network site, the network site image depicting a plurality of physical objects;

determining a true gravity vector using one or more inertial sensors of the client device to detect true gravity;

determining image plane gravity by generating a vector component of the true gravity vector in an image plane of the network site image and storing the vector component as the image plane gravity;

displaying, in the user interface, an editorial tag depicted as hanging from one of the plurality of physical objects towards the image plane gravity;

generating, in the user interface, a user tag depicted as hanging from another of the plurality of physical objects towards the image plane gravity, the user tag generated from a browsing user of the network site, wherein the user tag displayed on the network site image is visually distinguishable from the editorial tag displayed on the network site image;

detecting, using the one or more inertial sensors of the client device, movement of the client device while the network site image is displayed on the client device;

determining that an updated vector component of the true gravity vector in the image plane is zero due to the movement causing the image plane to be perpendicular to the true gravity vector;

in response to the updated vector component being zero, setting the image plane gravity from the component of the true gravity vector in the image plane to a bottom of the network site image as displayed on the client device; and in response to the movement, animating the editorial tag and the user tag as undergoing pendulum motion with respect to image plane gravity as set to the bottom of the network site image due to the updated vector component being zero.

16. The non-transitory machine-readable medium of claim 15, the operations further comprising:

receiving selection of the editorial tag depicted as hanging from the one of the plurality of physical objects; and displaying, in the user interface, similar items that are similar to the one of the plurality of physical objects.

* * * * *